(12) United States Patent
Nelson et al.

(10) Patent No.: US 11,213,955 B2
(45) Date of Patent: Jan. 4, 2022

(54) SYSTEM AND METHOD OF PERFORMING OPERATIONS ON ARTIFACTS WITH STOWABLE ROBOTIC PODS

(71) Applicant: ABB Schweiz AG, Baden (CH)

(72) Inventors: Michael G. Nelson, Oxford, MI (US); Timothy A. Brownlee, Brownstown, MI (US); Robert J. Santen, Maineville, OH (US); Didier M. Rouaud, Bloomfield, MI (US); Douglas B. Polkinghome, White Lake Township, MI (US)

(73) Assignee: ABB Schweiz AG, Baden (CH)

( * ) Notice: Subject to any disclaimer, the term of this patent is extended or adjusted under 35 U.S.C. 154(b) by 307 days.

(21) Appl. No.: 15/421,191

(22) Filed: Jan. 31, 2017

(65) Prior Publication Data

US 2017/0203441 A1    Jul. 20, 2017

Related U.S. Application Data

(63) Continuation of application No. PCT/US2015/042249, filed on Jul. 27, 2015.
(Continued)

(51) Int. Cl.
*B25J 11/00* (2006.01)
*B25J 9/16* (2006.01)
(Continued)

(52) U.S. Cl.
CPC ........... *B25J 11/005* (2013.01); *B25J 9/0009* (2013.01); *B25J 9/162* (2013.01); *B25J 11/0075* (2013.01);
(Continued)

(58) Field of Classification Search
CPC ..................................... B64F 5/30; B64F 5/40
See application file for complete search history.

(56) References Cited

U.S. PATENT DOCUMENTS 4,872,419 A * 10/1989 Blankemeyer .......... B05B 16/00
118/713
4,881,581 A * 11/1989 Hollerback ............ B60K 15/04
141/113
(Continued)

FOREIGN PATENT DOCUMENTS

FR      2550984 A1    3/1985
WO      0140109 A1    6/2001

OTHER PUBLICATIONS

Screenshots of Youtube clip entitled "Iron Man—Suit Up Scene—Mark III Armor—Movie CLIP HD" from 2008 Iron Man movie; pp. 1-6 Uploaded on Jun. 7, 2017 by user "TopMovieClips"; Retrieved from the Internet URL:<https://www.youtube.com/watch?v=t86sKsR4pnk> (Year: 2008).*
(Continued)

*Primary Examiner* — Kenneth M Lo
*Assistant Examiner* — Jonathan Michael Skrzycki
(74) *Attorney, Agent, or Firm* — Leydig, Voit & Mayer, Ltd.

(57) ABSTRACT

A system and method for operating at least one stowable automated robotic pod in a workplace having a workpiece is disclosed. The pod includes a robot on a base that can also include one or both of a tool nest and process equipment. A door to subfloor storage allows the pod to raise its base vertical, placing the robot into the desired vertical position in the workspace. Once operations on the workpiece are complete, the pod withdraws back to the subfloor storage and the doors to the storage volume close.

18 Claims, 6 Drawing Sheets

Related U.S. Application Data (60) Provisional application No. 62/031,854, filed on Jul. 31, 2014.

(51) Int. Cl.
  *G05B 19/19* (2006.01)
  *B64F 5/30* (2017.01)
  *B64F 5/40* (2017.01)
  *B25J 9/00* (2006.01)
  *G05B 19/418* (2006.01)

(52) U.S. Cl.
  CPC ............ *B25J 11/0085* (2013.01); *B64F 5/30* (2017.01); *B64F 5/40* (2017.01); *G05B 19/19* (2013.01); *G05B 19/41815* (2013.01); *G05B 2219/40272* (2013.01); *G05B 2219/40284* (2013.01); *G05B 2219/45071* (2013.01)

(56) References Cited

U.S. PATENT DOCUMENTS

| | | | | |
|---|---|---|---|---|
| 5,570,992 | A * | 11/1996 | Lemelson | B23Q 11/10 414/744.3 |
| 6,507,163 | B1 | 1/2003 | Allen | |
| 2006/0041328 | A1 * | 2/2006 | McCormick | B25J 9/161 700/179 |
| 2011/0061185 | A1 * | 3/2011 | Kimener | B65G 69/2823 14/71.1 |
| 2013/0168499 | A1 * | 7/2013 | Grossman | B64D 7/00 244/135 A |
| 2013/0226340 | A1 * | 8/2013 | Buchstab | B25J 5/02 700/245 |
| 2013/0309055 | A1 * | 11/2013 | Yoshinaga | B25J 18/04 414/680 |

OTHER PUBLICATIONS

Gillespie Corp., Sidewalk Elevator with Safety Screens technical drawings and features, 2006, retrieved from the internet archive for date Oct. 17, 2006, URL<:https://web.archive.org/web/20061017013633/http://gillespiecorp.com/documents/gillespie-sidewalk-elevator-drum-6x6-2000-with-screen-info.pdf> (Year: 2006).*

Yet another sidewalk elevator—doors open 3:41, jimster586, Sep. 10, 2011, screenshots taken from youtube video showing Gillespie sidewalk elevator URL:<https://www.youtube.com/watch?v=kfRZtQYPyBE> (Year: 2011).*

Yet another sidewalk elevator—doors closed 1:48, jimster586, Sep. 10, 2011, screenshots taken from youtube video showing Gillespie sidewalk elevator URL:<https://www.youtube.com/watch?v=kfRZtQYPyBE> (Year: 2011).*

Yet another sidewalk elevator—doors closing 5:33, jimster586, Sep. 10, 2011, screenshots taken from youtube video showing Gillespie sidewalk elevator URL:<https://www.youtube.com/watch?v=kfRZtQYPyBE> (Year: 2011).*

Yet another sidewalk elevator—safety barrier 2:24, jimster586, Sep. 10, 2011, screenshots taken from youtube video showing Gillespie sidewalk elevator URL:<https://www.youtube.com/watch?v=kfRZtQYPyBE> (Year: 2011).*

Yet another sidewalk elevator—selective opening 2:09, jimster586, Sep. 10, 2011, screenshots taken from youtube video showing Gillespie sidewalk elevator URL:<https://www.youtube.com/watch?v=kfRZtQYPyBE> (Year: 2011).*

International Search Report for PCT International Application Serial No. PCT/US2015/042249, completed Nov. 17, 2015 (5 pages).

Written Opinion of the International Searching Authority PCT/US2016/042249, completed Feb. 4, 2016 (8 pages).

* cited by examiner

FIG. 5

SYSTEM AND METHOD OF PERFORMING OPERATIONS ON ARTIFACTS WITH STOWABLE ROBOTIC PODS

FIELD OF INVENTION

The present disclosure concerns systems and methods for performing automated manufacturing, maintenance and other operations with a computer-controlled robot workstation.

BACKGROUND

Due to their size and shape, certain large artifacts can pose challenges in performing manufacturing operations on the artifacts. Such artifacts include but are not limited to aircraft and aircraft parts such as wings and engines; wind-turbines and associated parts such as blades and towers; boats, ships, and constituent parts such as hulls and rudders; trains and train parts such as engine, carriages, and axles; defense artifacts such as missile bodies, and tanks; rail cars, locomotives, infrastructure elements and assemblies such as bridges, towers, and building subassemblies, and agricultural and earth moving machines, and their subassemblies. The manufacturing and finishing operations performed on such artifacts can vary, and can include but are not limited to cleaning, polishing, sanding, abrading, washing, drying, tacking, wiping, painting, sealing, surface inspecting, scrubbing, treating, masking, de-masking, taping, printing, and labeling. Further, large artifacts can require repairing or reprocessing in connection with these processes. The aforementioned operations and processes can be required in a particular area or entire surface of the large artifact. Thus, systems and methods for performing operations on large artifacts are desirable.

SUMMARY

A system and method for operating at least one stowable automated robotic pod in a workspace having a workpiece is disclosed. The pod includes a robot on a base that can also include one or both of a tool nest and process equipment. A door to subfloor storage allows the pod to raise its base vertically, placing the robot into the desired vertical position in the workspace. Once operations on the workpiece are complete, the pod withdraws back to the subfloor storage and the doors to the storage volume close.

BRIEF DESCRIPTION OF THE DRAWINGS

In the accompanying drawings, structures and methods are illustrated that, together with the detailed description provided below, describe aspects of a system and method for performing operations on large workpieces. It will be noted that a single component may be designed as multiple components or that multiple components may be designed as a single component.

Further, in the accompanying drawings and description that follow, like parts are indicated throughout the drawings and written description with the same reference numerals, respectively. The figures are not drawn to scale and the proportions of certain parts have been exaggerated for convenience of illustration.

DETAILED DESCRIPTION

Figure 1:
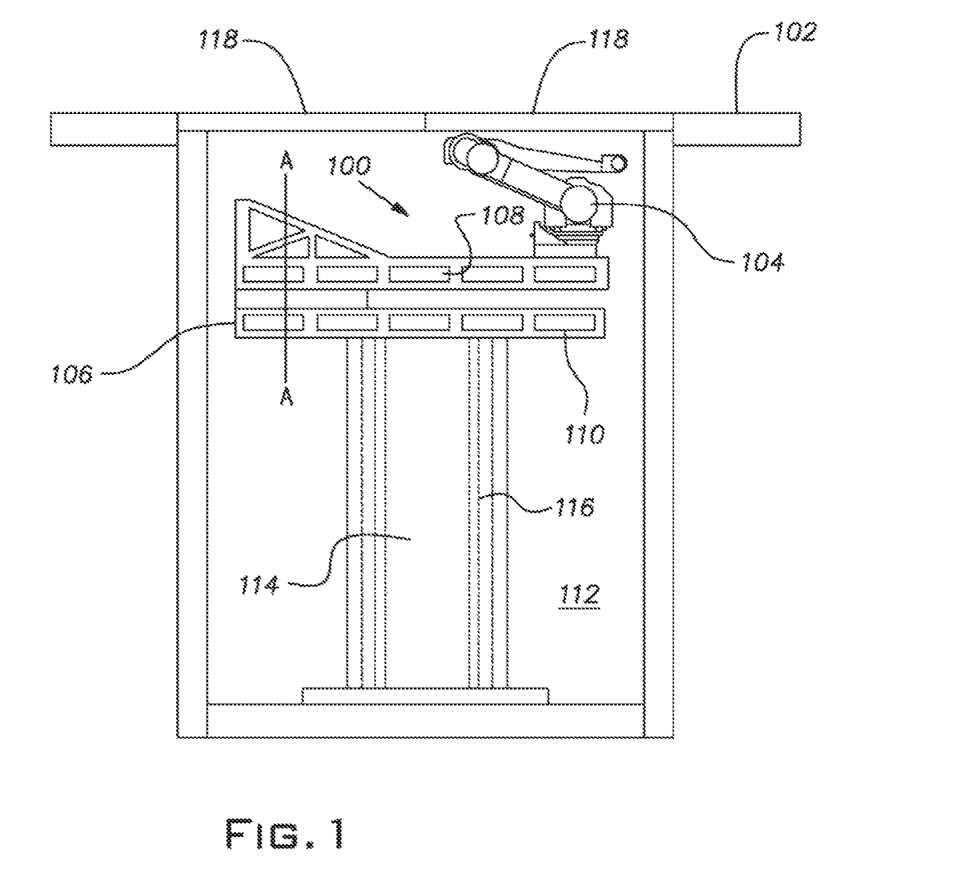
FIG. 1 illustrates a schematic view of a stowed robotic pod 100.
Figure 3:
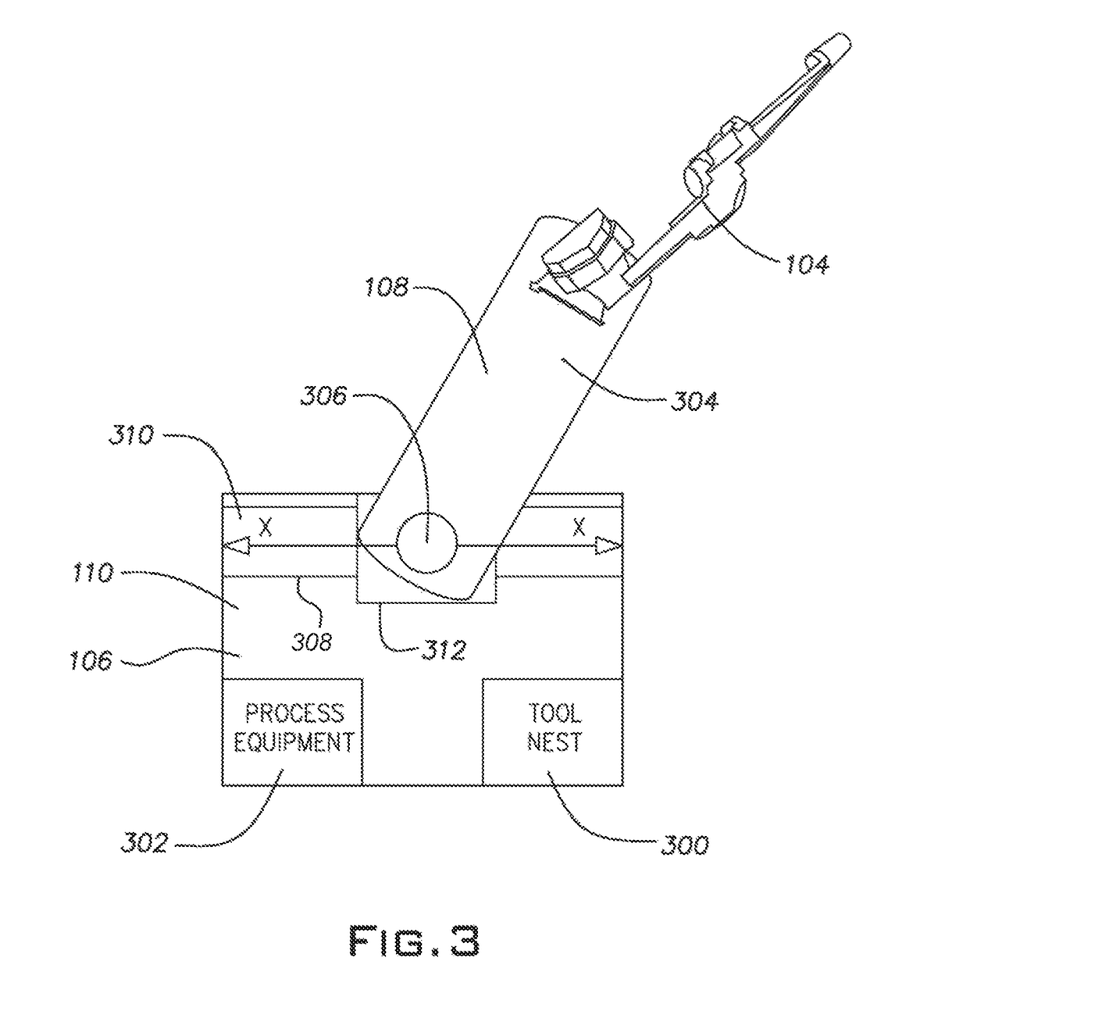
FIG. 3 illustrates an overhead schematic view of robotic pod 100.

With reference to FIG. 1, a self-contained robotic pod 100 is shown in a stowed position below floor 102. The pod 100 includes robot 104, which is positioned on a base 106. The base 106 includes an upper portion 108 and lower portion 110. As shown in FIG. 3, the upper portion 108 can rotate about axis A with respect to the lower portion 110, allowing an additional degree of freedom in operating the robot 104, which is a six-axis articulated robot 104. The base 106 and robot 104 can be selectively moved vertically from the subfloor volume 112 with lift 114. According to one alternative, facilities with basement space can use such space instead of a dedicated subfloor volume 112. The illustrated lift 114 includes telescoping arm 116 that is secured to the base 106 and lifts the base 106 and robot 104 and any additional items on the pod 100 from the subfloor storage volume 112 to the workspace. The lift 114 can alternatively have scissor arms providing the vertical linear motion. Any operating mechanism for the lift 114, such as pumps, gears or other devices can be stored in the subfloor volume 112. Further, the operating mechanism for the pod 100 and the robot 104 in particular can be stored within the subfloor volume 112 or elsewhere. As shown in FIG. 1, doors 118 are in a closed position and are flush with the floor 102.

Figure 2:
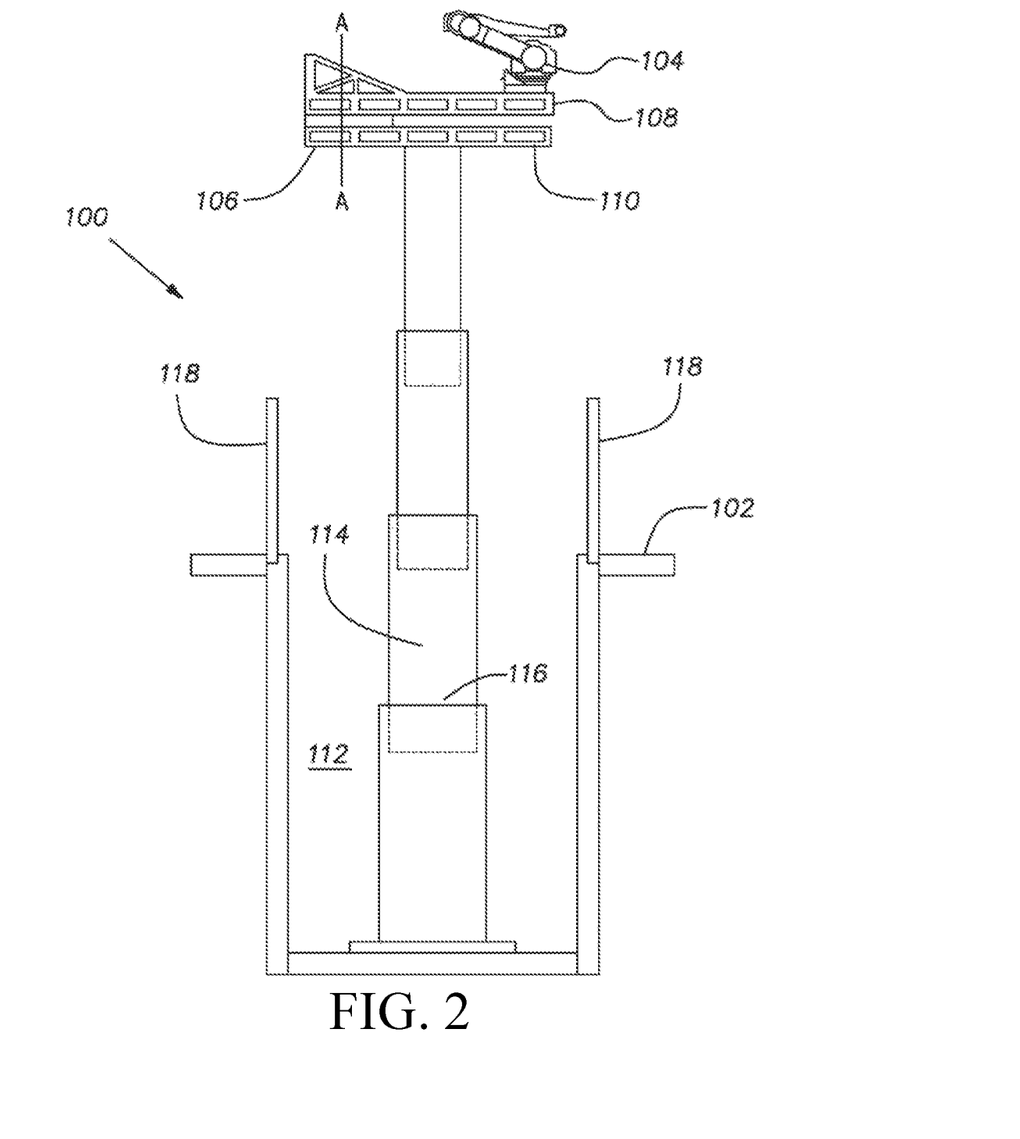
FIG. 2 illustrates a schematic view of an extended robotic pod 100.

With reference to FIG. 2, the pod 100 is shown extended out of the subfloor volume 112 as would be done during operation of the robot 104 to perform manufacturing processes. The doors 118 are in the open position, and can extend vertically when open as shown to provide a safety barrier to workers in proximity to the pod 100. The telescoping arm 116 of the pod can lift the robot 104 to the necessary height to perform manufacturing processes. The subfloor volume 112 can be configured to allow staff access to the pod 100 in order to perform maintenance or service on the pod, or to perform tasks related to operations and processes performed on a workpiece, such as the workpiece described in FIGS. 4 and 5.

With reference to FIG. 3, according to one aspect of the present teachings, the pod 100 can also include one or both of a tool nest 300 and process equipment 302. The tool nest 300 can include delivery systems and application equipment such as paint atomizers, dispensers, paint guns, abrasive tools, inspections tools, cameras, and other devices for performing manufacturing and finishing operations and processes. Process equipment 302 can include paints, sealer, coatings, mixing equipment, consumables, and space for material storage. Placement of the process equipment on the pod 100 can allow for less supply equipment to be used when automating certain tasks. For example, providing paint supplies with the process equipment can reduce the amount of supply lines required to deliver paint to the robot 104. Further, the proximity of tools in the tool nest 300 allows for quick transition from one task to the next. Placement of the tool nest 300 on the base 106 also allows for easier storage of the pod 100. According to another aspect of the present teaching, the pod 100 includes universal docking stations for one or both of the tool nest 300 and process equipment 302. This allows for flexible swapping out of the tool nest 300 and process equipment 302 with replacement tool nest 300 and process equipment 302 required for successive tasks. According to yet another aspect of the present teachings, the pod 100 can identify one or both of the tool nest 300 or process equipment 302 loaded onto the pod 100. Such recognition can include abstract identification, such as identifying that one or both of a tool nest 300 or process equipment 302 have been mounted to the pod 100. According to another aspect of the present teachings, the identification can be specific, including recognizing whether a particular tool nest 300 contains painting tool or cleaning tools, for example. Once the pod 100 has identified one or both of the tool nest 300 or process equipment 302, the pod can initiate startup sequences or working parameters based upon the selection of tool nest 300 and process equipment 302. The identification of the tool nest 300 or process equipment 302 can be realized through a variety of devices including but not limited to RFID tags and detection equipment, through lock and key mechanical interfaces, or other methods. Further, the pods 100 can perform predetermined instructions upon receiving a particular tool nest 300 or process equipment 302. Such instructions can include but are not limited to mounting a particular spray gun from the tool nest 300 onto the robot 104 or purging a paint feed line among the process equipment 302.

With continued reference to FIG. 3, the illustrated robot 104 is configured for applying paint or other coatings to a workpiece. According to another aspect of the present teachings, the robot 104 can be a general purpose robot. The upper base portion 108 on which the robot 104 is mounted at one end serves as an arm 304 rotatable about pivot 306 at the end of arm 304 opposite robot 104. It should be noted that counterweights placed on the base 106 can be used to balance the pod 100 while it is in any accessible orientation. In addition to the rotational degree of freedom provided by pivot 306, an additional linear degree of freedom along axis X is provided by the track 308 having two rails 310. A carriage 312 on which robot 104 is mounted interfaces with the rails 310 and can be moved along the track 308 in order to provide the desired motion for the robot 104 along the axis X. With the six axes available to the robot and the additional three axes provided by the rotation around pivot 306, movement along the track 308, and the vertical motion provided by lift 114, a total of nine degrees of freedom are available to the robot 104. More or less degrees of freedom can be implemented according to the present teachings. For example, one or both of the rotation about pivot 306 and movement along track 308 can be removed to reduce the degrees of freedom by one or two degrees. Further, a less articulable robot 104 than the illustrated six-axis robot 104 can be implemented. Additional pivot points and tracks in additional directions can also be included to increase the total degrees of freedom available to the pod 100.

The pod 100 can be shipped integrally or modularly over commonly available carriage, and can be readily installed in a pre-formed subfloor volume 112. According to one aspect of the present teachings, the pod 100 can operate with only a physical communication connection, such as Ethernet or a wireless connection, and a power source, such as a 420 volts AC source. According to yet another aspect of the present teachings, the pod 100 can also require a forced air supply to operate, for instance when applying paints.

Figure 4:
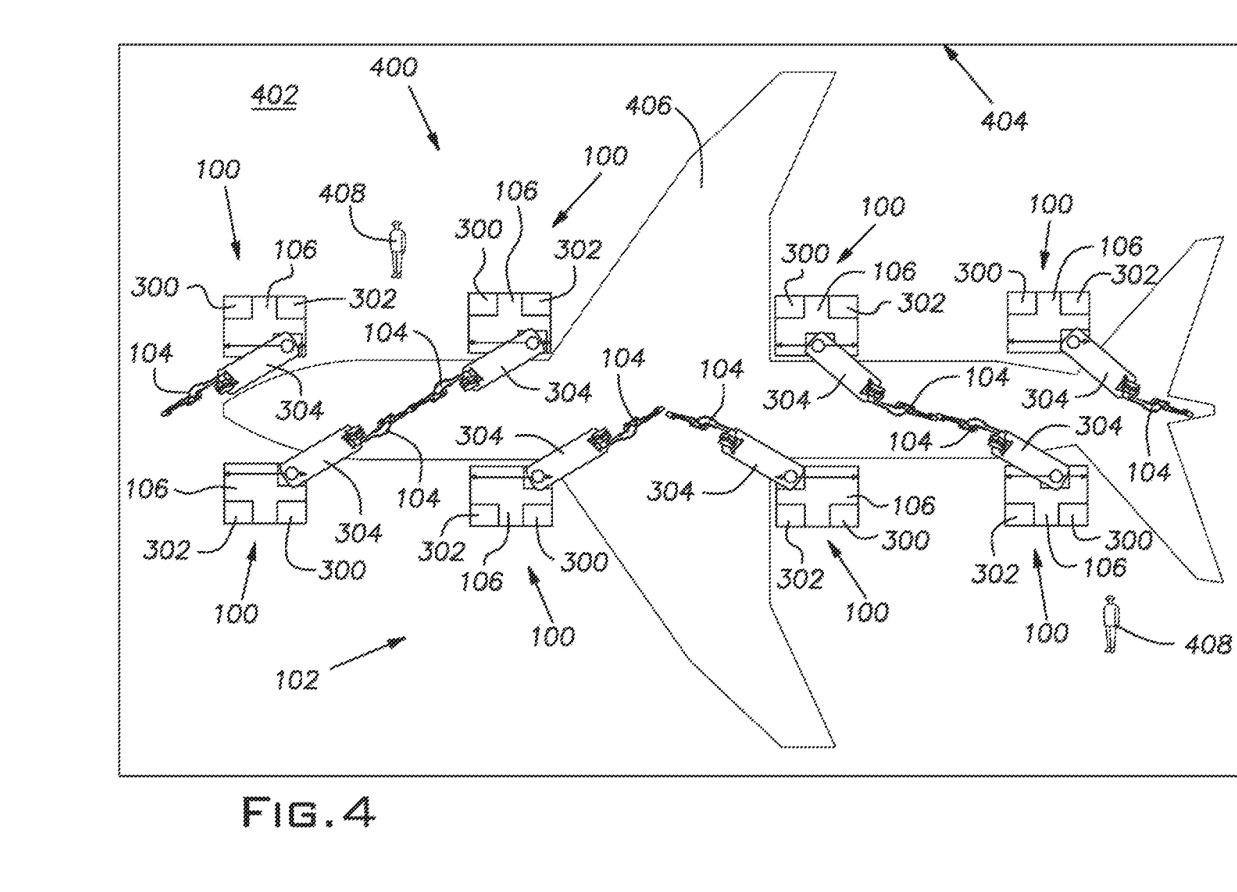
FIG. 4 illustrates a schematic view of system 400 performing operations on workpiece 406.

With reference to FIG. 4, the system 400 includes eight pods 100 positioned in a workspace 402 defined at least in part by walls 404 and floor 102. A workpiece 406 is disposed within the workspace 402. The illustrated workpiece 406 is a large artifact in the form of a commercial aircraft. While an aircraft is illustrated, other items can serve as workpieces 406 according to the present teachings. Examples of such items include but are not limited to aircraft wings, fuselages, engine nacelles, windmill turbine blades, rockets and other large, complex structures. While a booth can form a desirable workspace 402, the volume in which the workpiece 406 is disposed need not be a dedicated booth, but instead can be any volume sufficient to hold the workpiece 406 and allow installation and operation of the system 400 as described herein.

Figure 5:
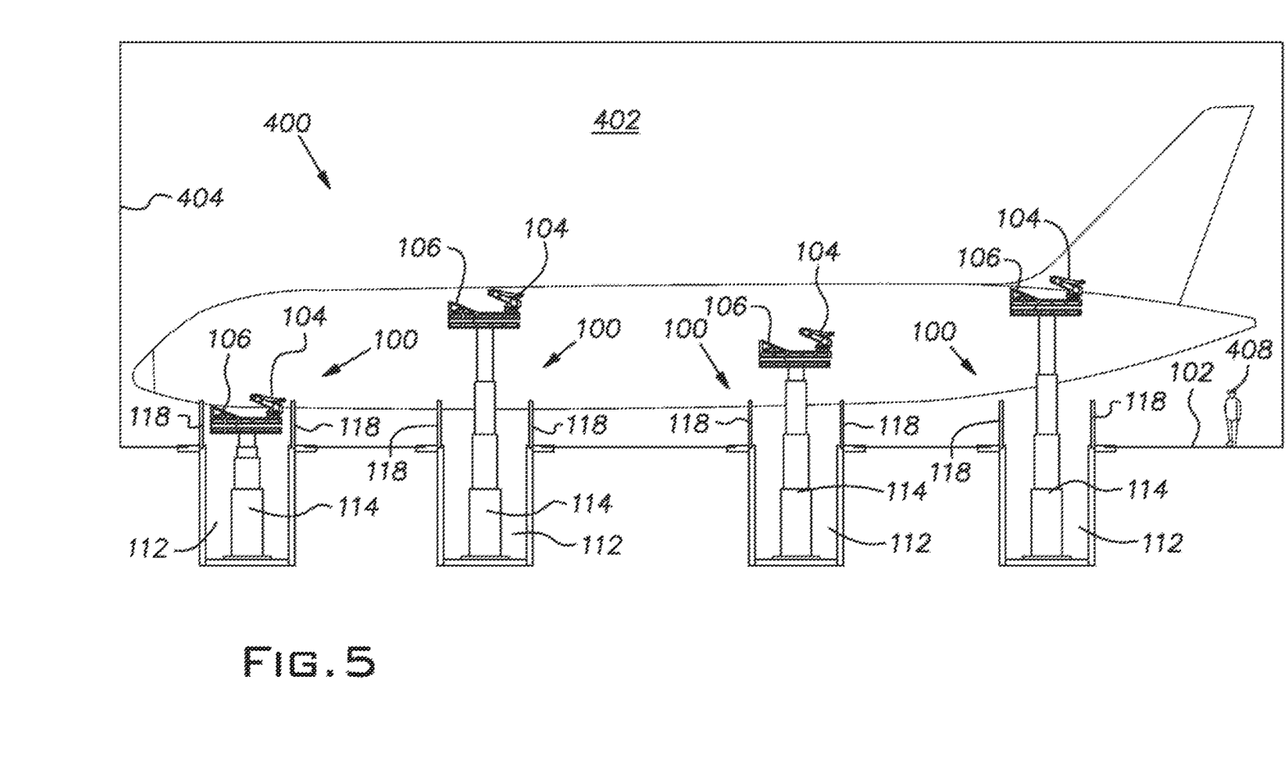
FIG. 5 illustrates an alternate schematic view of system 400 performing operations on workpiece 406.

With reference to FIGS. 4 and 5, the eight sets of stowable pods 100 are shown in an operating position extending from the subfloor volume 112. It should be noted that more or less than eight pods 100 can be implemented according to the present teachings. The number of pods 100 used can be dictated by several considerations such as available workspace and capacity needs. The workpiece 406 can be brought into the workspace 402 while the stowable pods 100 are withdrawn into the subfloor volume 112 and the doors 118 to the subfloor volume 112 are closed. When the doors 118 are in the closed configuration, the doors 118 can lie flush with the level of the floor 102. This arrangement allows unimpeded use of the workspace 402. For example, when all eight sets of doors 108 shown in FIGS. 4 and 5 are closed, the workpiece 406 can, for example, be rolled over and on the closed doors 118 without damaging the pods 100. Further, the choice of workpiece 406 need not be limited by constraints imposed by the difficulty of moving robot workstations or navigating around fixed robot workstations that cannot be hidden under the floor 102 or otherwise removed as an impediment to introducing a workpiece 406. Once the doors 118 are opened, the pods 100 can raise the robot 104 to a suitable working elevation relative to the workpiece 406 within the workspace 402. As shown in FIG. 5, the each of the pods 100 can be selectively raised to different heights relative to the workpiece 406 and one another.

According to other aspects of the present teachings, the pods 100 can be mounted on tracks that allow movement throughout the workspace 402 but that allow the pods 100 to be withdrawn to a discreet location within the workspace 402. This permits human operators 408 to perform manual tasks without interference from the pods 100. Withdrawing the pods 100 further permits moving a large workpiece 406 into the workspace 402. Pods 100 can also be installed in other locations within a workspace 402, such as from a ceiling, or other predetermined locations on the floor 102 that can be permanently or temporarily fixed.

According to another aspect of the present teachings, extended portions of track, such as track 308, can be implemented. In one implementation, one or more pods 100 can be mounted on an elongated track 308 that spans a length of the workspace 402 longer than that permitted by a single base 106 as shown in FIGS. 4 and 5. Such a track 308 can be disposed on one or more bases 106 raised by one or more lifts 114. For example, a single elongated base can have two lifts 114, one at each end of the base 106 adjacent a terminal of the track 308. Such an elongated track 308 can permit a linear degree of motion along a greater portion of the subject workpiece 406, such as the aircraft workpiece shown in FIGS. 4 and 5 than the tracks 308 on individual bases 106 shown in FIGS. 4 and 5. According to another aspect of the present teachings, an elongated track 308 can be segmented and disposed on multiple bases 106 each supported by a lift 114 that can raise the track 308 segments individually to a predetermined height, effectively forming a continuous elongated track 308.

Human operators 408 can be present within the workspace 402 while the pods are working on the workpiece 406. According to other aspect of the present teachings, human operators 408 can be stationed on the pods 100 while the pods perform their operations on the workpiece 406. The interactions available to the human operators 408 can vary, and can include comprehensive real time control over the operation of the pod 100 and robot 104. A programming interface on the pod, such as computer screen, keyboard, and mouse, manual controls, safety overrides, and other manner of controls can also be available to users to provide various levels of onboard control of the pod 100. According to one aspect of the present teachings, a pod 100 can be implemented according to safety codes, regulations or standards followed, promulgated or otherwise required by governmental code or regulation. Such adherence can include the safety sensors and monitoring devices, Safety Programmable Logic Controllers ("SAFE PLC"), additional and redundant controllers, alarms, shut down mechanisms, human-machine interfaces configured for safe use, power interfaces and mechanical safety devices such as doors. A variety of additional safety mechanisms can be implemented according to the present teachings.

Figure 6:
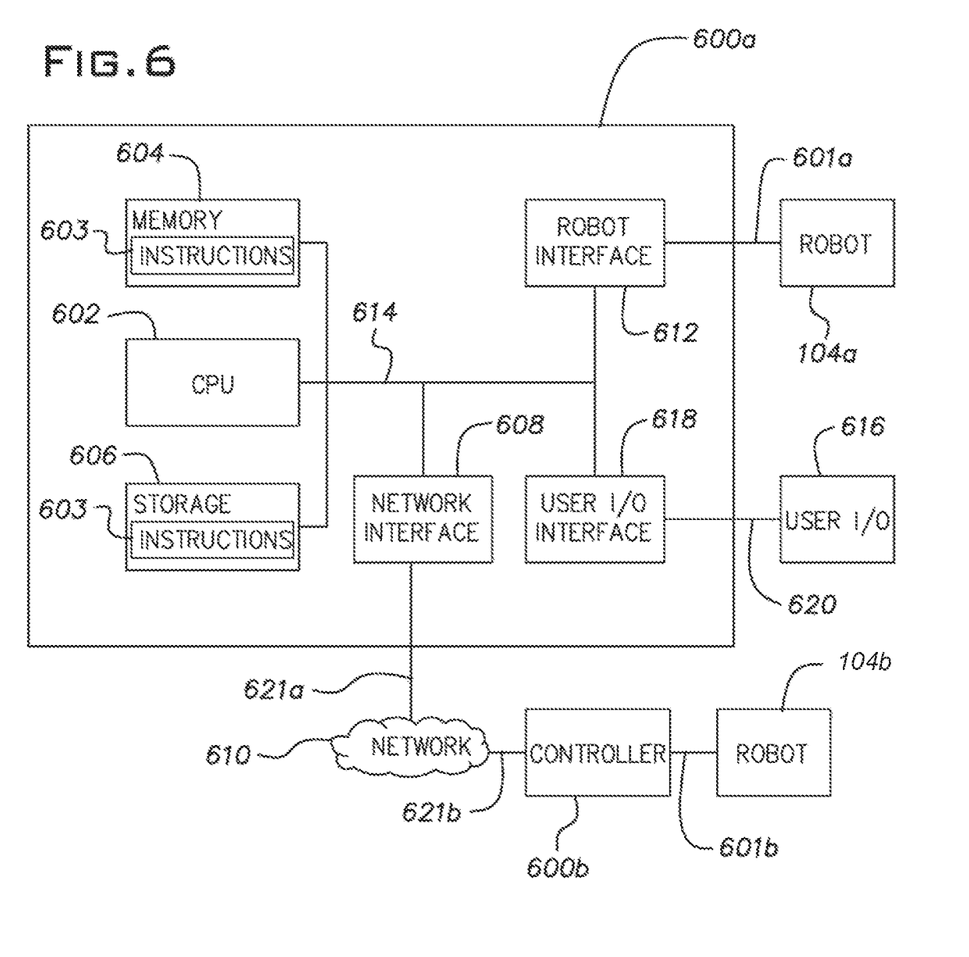
FIG. 6 illustrates a diagrammatic view of a controller 600.

With reference to FIG. 6, controller 600a includes a central processing unit ("CPU") 602, non-transient computer storage media such as random access memory ("RAM") 604 and hard drive storage 606 that can include one or more solid state and magnetic hard drives, for examples. The CPU 602 executes instructions 603 stored on non-transient computer storage media, such as one or both of the RAM 604 and storage 606. The instructions 603 written on one or both of the RAM 604 and storage 606 are written in a suitable computer-readable programming language such as the C programming language, or a programming language written for use with robots, such as the RAPID programming code, made available by ABB, Inc. In addition, planning and programming of automated processes can be performed by use of software such as RobotStudio® which permits loading of three-dimensional models of the workpiece (e.g., CAD representations of the workpiece), into RobotStudio® and programming and simulating the robot processes within RobotStudio®.

The controller 600a is connected to robot 104a through electrical connection 601a, such as one or more cables. A robot interface 612 manages communication between the robot 104a and controller 600a, transmitting electrical signals and optionally operating power to the robot 104a. According to one aspect of the present teachings, upon execution of the instructions 603 stored on at least one of the RAM 604 or storage 606 by the CPU 602, the CPU 602 provides signals to the robot interface 612 through the bus 614 that cause to the robot interface 612 to communicate signals to the robot 104a though connection 601a. The signals provided by robot interface 612 in turn cause the robot 104a to move and perform operations as directed by the CPU 602. The robot interface 612 can, for example, cause the robot 104a to move to a particular position or move with a particular velocity along a determined path and apply paint, sand, or otherwise perform operations on the workpiece 406.

A user input/output (I/O) 616 such as a keyboard or remote control can be used to input instructions 603 into controller 600a. The user I/O 616 communicates with the user I/O interface 618 through connection 620. The user I/O 616 can be used to input instructions 603 into the controller 600a. According to one aspect of the present teachings, the user I/O 616 can be used to by a human operator 408 to input instructions 603 that result in operations being performed by the pod 100 on the workpiece 406.

A network interface 608 permits connection between controller 600a and a network 610 through physical connection 621a, such as an Ethernet connection. It should be noted that wireless connections can also be implemented instead of or in addition to physical connection 621a. Additional controller 600b is also connected to robot 104b with connection 601b and to the network 610 through connection 621b allowing the controllers 600a, 600b to be in communication and further allowing the controllers 600a, 600b to synchronize the actions of the pods 100 while performing operations on workpiece 406. It should be noted that the aspects of controllers 600a, 600b described herein can be distributed, such as by providing computing resources and memory through a computer workstation, and providing the robot interface within a separate unit that communicates with the pods 100 through a communication link. According to another aspect of the present teachings, the controllers 600a, 600b can be configured to communicate with and control the pod 100, including any of its aspects, the robot 104a, the robot 104b, the base 106, the lift 114, and the doors 118. Such control can extend to any of the degrees of motion available of the pod 100.

For the purposes of this disclosure and unless otherwise specified, "a" or "an" means "one or more." To the extent that the term "includes" or "including" is used in the specification or the claims, it is intended to be inclusive in a manner similar to the term "comprising" as that term is interpreted when employed as a transitional word in a claim. Furthermore, to the extent that the term "or" is employed (e.g., A or B) it is intended to mean "A or B or both." When the applicants intend to indicate "only A or B but not both" then the term "only A or B but not both" will be employed. Thus, use of the term "or" herein is the inclusive, and not the exclusive use. See, Bryan A. Garner, A Dictionary of Modern Legal Usage 624 (2d. Ed. 1995). Also, to the extent that the terms "in" or "into" are used in the specification or the claims, it is intended to additionally mean "on" or "onto." As used herein, "about" will be understood by persons of ordinary skill in the art and will vary to some extent depending upon the context in which it is used. If there are uses of the term which are not clear to persons of ordinary skill in the art, given the context in which it is used, "about" will mean up to plus or minus 10% of the particular term. From about A to B is intended to mean from about A to about B, where A and B are the specified values.

While the present disclosure illustrates various embodiments, and while these embodiments have been described in some detail, it is not the intention of the applicant to restrict or in any way limit the scope of the claimed invention to such detail. Additional advantages and modifications will be apparent to those skilled in the art. Therefore, the invention, in its broader aspects, is not limited to the specific details and illustrative examples shown and described. Accordingly, departures may be made from such details without departing from the spirit or scope of the applicant's claimed invention. Moreover, the foregoing embodiments are illustrative, and no single feature or element is essential to all possible combinations that may be claimed in this or a later application.

What is claimed is:

1. A method for operating a stowable automated robotic pod in a workspace having a workpiece, the pod including a robot on a base, the base having an upper portion and a lower portion, the upper portion forming an arm upon which the robot is mounted, the arm being mounted on and rotatable around a vertical axis relative to the lower portion about a pivot that is located on an end of the arm opposite the robot, the method comprising:
- opening a pair of doors to a subfloor storage volume, wherein the pair of doors are pivotably connected to a floor on opposite sides of the subfloor storage volume and are movable between a closed position and an open position, wherein in the closed position during storage of the robot the pair of doors are flush with the floor and in the open position during use of the robot each of the pair of doors extends upward toward a vertical position and provides a safety barrier to the subfloor storage volume;
- raising the base vertically through the opening formed by the pair of doors in the opening position from the subfloor storage volume into the workspace, wherein a second robotic pod includes a second robot on a second base, wherein the lower portion of the base of the robot includes a track and a second lower portion of the second base of the second robot includes a second track, wherein the track aligns to the second track to form a continuous track when the base and the second base are raised to a predetermined height, and wherein the arm of the base is selectively horizontally translatable relative to the lower portion and the second lower portion along the continuous track;
- rotating the arm of the base around the vertical axis about the pivot relative to the lower portion so that the arm extends horizontally from the lower portion;
- performing one or more predetermined operations on the workpiece with the robot;
- lowering the base vertically into the subfloor storage volume; and
- closing the pair of doors to the subfloor storage volume.

2. The method of claim 1, wherein the performing one or more predetermined operations includes performing one or more of cleaning, polishing, sanding, abrading, washing, drying, tacking, wiping, painting, sealing, surface inspecting, scrubbing, treating, masking, de-masking, taping, printing, labeling, riveting, drilling, assembling, gluing, wiring, or installing parts onto the workpiece.

3. The method of claim 1, further comprising:
- translating the arm along the lower portion of the base via the track that is located on the lower portion of the base that extends along a horizontal axis that is transverse to the vertical axis.

4. The method of claim 3, wherein the translating the arm along the lower portion of the base includes moving a carriage of the arm horizontally along rails of the track on the lower portion of the base.

5. The method of claim 1, further including mounting a tool set to the pod, wherein a controller recognizes the tool set and causes the pod to perform at least one predetermined operation.

6. The method of claim 5, wherein the predetermined operations include installing one or more tools onto the robot.

7. The method of claim 1, further comprising:
- opening a second pair of doors to a second subfloor storage volume;
- raising the second base vertically through an opening formed by the second pair of doors in the open position from the second subfloor storage volume into the workspace; and
- aligning the second track of the second base with the track of the raised base to form the continuous track.

8. A system for operating at least one stowable automated pod comprising a robotic pod and a second robotic pod in a workspace, comprising:
- a robot on a base, wherein the base includes an upper portion and a lower portion, the upper portion forming an arm upon which the robot is mounted, the arm being mounted on and rotatable around a vertical axis relative to the lower portion about a pivot located at an end of the arm opposite the robot so that the arm can be rotated to extend horizontally from the lower portion of the base, the lower portion including a track;
- a second robot on a second base, wherein a second lower portion of the second base of the second robot includes a second track, wherein the track aligns to the second track to form a continuous track when the base and the second base are raised to a predetermined height, and wherein the arm of the base is selectively horizontally translatable relative to the lower portion and the second lower portion along the continuous track;
- a subfloor storage volume;
- a fixed support floor located at a bottom of the subfloor storage volume;
- a pair of doors pivotably connected to a floor located above the subfloor storage volume on opposite sides of the subfloor storage volume that are movable between a closed position and an open position, wherein in the closed position during storage of the robot the pair of doors are flush with the floor and in the open position during use of the robot each of the pair of doors extends upward toward a vertical position and provides a safety barrier to the subfloor storage volume;
- a lift operable to selectively move the robot on the base between the subfloor storage volume and the workspace, wherein the lift is connected to the fixed support floor at one end and to the lower portion of the base at an opposing end; and
- a controller in operable communication with the robot, the controller including a processor and a non-transient computer-readable medium including instructions that upon execution by the processor perform an operation on the workpiece with the robot.

9. The system of claim 8, wherein in the closed position the pair of doors form a portion of the floor of the workspace and are openable to permit the pod to selectively move between the subfloor storage volume and workspace.

10. The system of claim 8, wherein the arm is selectively translatable relative to the lower portion of the base on the track that is located on the lower portion of the base and the track extends along a horizontal axis that is transverse to the vertical axis.

11. The system of claim 10, wherein the arm of the base includes a carriage that interfaces with and moves horizontally along rails of the track on the lower portion of the base.

12. The system of claim 8, further comprising:
- a selectively mountable tool set.

13. The system of claim 12, further comprising:
- instructions on the non-transient computer readable medium that upon execution identify the tool set.

14. The system of claim 13 further comprising:
- instructions on the non-transient computer readable medium that upon execution perform predetermined operations based upon an identification of the tool set.

15. The system of claim 14 further comprising:
- instructions on the non-transient computer readable medium that upon execution installs one or more tools in the tool set onto the robot based upon an identification of the tool set.

16. The system of claim 8 further comprising:
instructions on the non-transient computer readable medium that upon execution causes the pod to replace a tool on the robot.

17. The system of claim 8,
wherein the second base includes the second lower portion and a second upper portion forming a second arm upon which the second robot is mounted, the second arm being mounted on and rotatable around a second vertical axis relative to the second lower portion about a second pivot located at an end of the second arm opposite the second robot; and
the system further comprising:
- a second lift operable to selectively move the second robot and the second base between a second subfloor storage volume and the workspace,
- wherein the second lift is connected to a second fixed support floor and to the second base, and
- wherein the second arm of the second base is selectively horizontally translatable relative to the lower portion and the second lower portion along the continuous track with each of the bases raised by the lifts to the predetermined height.

18. The system of claim 17, further comprising a second pair of doors pivotably connected to the floor located above the second subfloor storage volume that are movable between a closed position and an open position, wherein in the closed position during storage of the second robot the second pair of doors are flush with the floor and in the open position during use of the second robot each of the second pair of doors extends upward toward a vertical position and provides a safety barrier to the second subfloor storage volume.

* * * * *